H. GROSS.
Manure Fork.
No. 96,583. Patented Nov. 9, 1869.
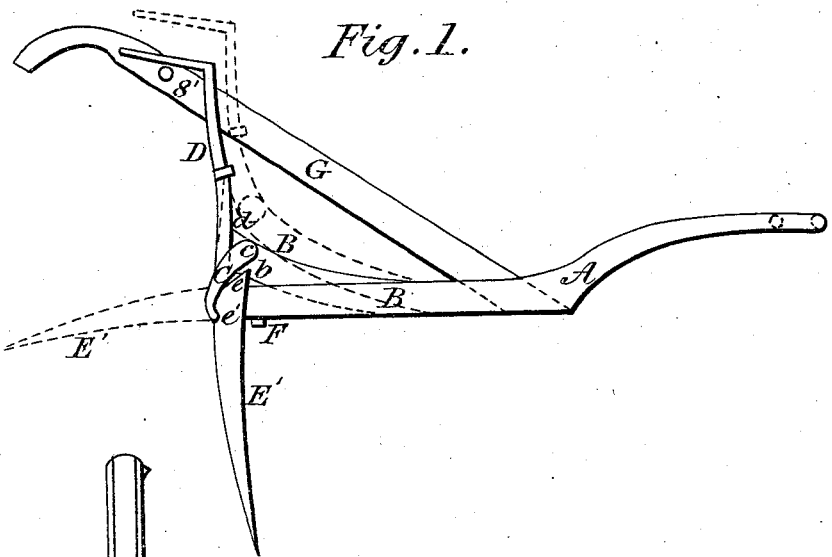
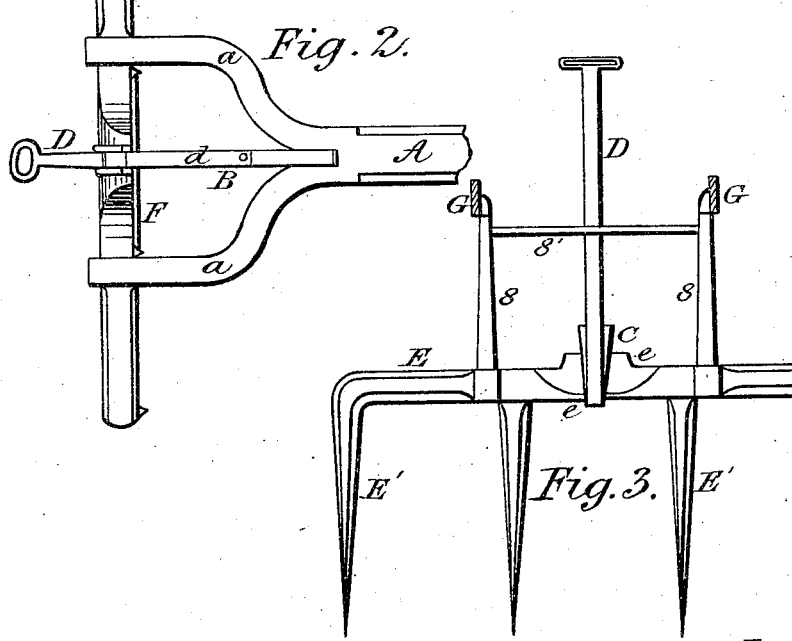
Witnesses: Inventor:

United States Patent Office.

HENRY GROSS, OF MIDDLETOWN, PENNSYLVANIA.

Letters Patent No. 96,583, dated November 9, 1869; antedated October 26, 1869.

IMPROVEMENT IN MANURE-HOOK OR DRAG.

The Schedule referred to in these Letters Patent and making part of the same.

*To all whom it may concern:*

Be it known that I, HENRY GROSS, of Middletown, in the county of Dauphin, and State of Pennsylvania, have invented certain new and useful Improvements in Manure-Hooks or Drags; and I do hereby declare that the following is a full, clear, and exact description of the same, reference being had to the accompanying drawing, and to the letters of reference marked thereon, making part of this specification, in which—

Figure 1 is a horizontal sectional view of the hook or drag.

Figure 2 is a top view.

Figure 3 is a rear-end view.

The nature of my invention consists in securing, between the forked arms of the main beam, of a manure-hook or drag, a compound bent catch or trigger-lever, so arranged that it is self-locking, and secures the tine-shaft in position for collecting the manure, and, at the same time, is so constructed that by simply elevating the handle, the catch or trigger is instantly disengaged from the shaft, so that the load can be immediately dropped, after which, if desired, the same leverage-mechanism will grasp the shaft in a reverse position, and one most convenient for transportation, as it can be drawn on the ground, freely passing all obstructions, the tines, in the latter case, being held parallel with the beam, instead of nearly at right angles to the same, which is their position when the drag is arranged for work.

The handles are stationary, and the tine-shaft works freely in bearings at the forked ends of the beam, being so adjusted that it swings in a reverse position, and drops the load the instant it is freed from the grasp of the catch or trigger.

To enable others skilled in the art to make and use my invention, I will now proceed to describe its construction and operation.

A is the main beam, and is constructed of iron, its rear end being forked, as shown at *a a*, fig. 2.

Between the rear ends of these forked arms *a a* is secured, by bolt, or other equivalent device, a lever, B. This lever is also of iron, and is slightly curved.

At its rear end it is provided with a V-shaped recess, *b*, in which fits the wedge-shaped projection or flange, on the tine-shaft, as clearly shown in fig. 1.

To this lever B is secured, by means of jaws and bolt *c*, a short catch or trigger-lever, C.

To the lower end of this snap-lever is secured the arm or handle D, by means of which the compound-lever mechanism is operated.

*d* is a metallic plate-spring, curved in form. One end of this spring *d* is permanently secured to the lever B, and the other to the arm or handle D, or, if desirable, one end of this spring *d* can be fastened to the main beam A, instead of to the lever B.

The tension of this spring *d* is such as to keep the handle or arm D in an upright position, and, at the same time, cause the catch or trigger-lever to bear against the tine-shaft, and to render the compound-lever mechanism self-locking.

E is the tine-shaft, and is provided with four or more tines E' E'.

This tine-shaft revolves freely in suitable bearings at the outer ends of the forked arms *a a*, of the main beam A.

Near the centre of this tine-shaft, and on its upper surface, is a slightly curved wedge-shaped projection, *e*, which fits in the recess *b* of the lever B, when the tines are in position for operation.

*e'* is a recess on the opposite or under side of the shaft, in which fits the snap-end of the catch and trigger-lever C.

F is a recessed check or guide-plate, on the under side of the beam, and extends across the forked ends of the same, serving to assist in retaining the tine-shaft in position, and preventing its being thrown too far forward, when set for operation.

G G are two handles, which may be made of wood, or any other suitable material. These handles are firmly secured to the beam A, and are perfectly stationary.

*g g* are uprights, which support the handles, the same being firmly secured to the forked ends *a a* of the beam A.

*g'* is a brace-rod, inserted between the handles, and serves to permanently secure the same together.

The operation is as follows:

The drag is in the position shown in section in fig. 1, the tines being nearly at right angles to the beam A. In this position it is firmly held by reason of the wedge-shaped projection *e*, on the tine-shaft E, entering the recess *b*, of the lever B, and the snap-end of the catch or trigger-lever C being in the recess *e'*, on the shaft E.

The check-plate F prevents the tines from being thrown forward beyond the angle shown at fig. 1.

So soon as sufficient manure has been collected, by simply pressing the upright arm or lever D forward, you can instantly free the catch or trigger-lever C, which will cause the shaft to revolve, and consequently drop the load.

The drag can then be set to collect another load by simply removing the pressure from the arm D, when the lever C will instantly re-engage with the shaft, and, owing to the pressure of the spring *d*, will lock the same in position; or, if preferred, the catch will grasp the shaft in a reverse position, and hold the tines in a position parallel with the beam A, all of which is clearly shown in red in fig. 1.

Having thus fully described my invention,

What I claim therein as new, and desire to secure by Letters Patent of the United States, is—

The compound lever B C and spring $d$, when the same are arranged and work in combination with the tine-shaft E, substantially as described, as and for the purpose specified.

In testimony whereof, I have signed my name to this specification, in the presence of two subscribing witnesses.

HENRY GROSS.

Witnesses:
BENJAMIN S. PETERS,
J. SCHAEFFER.